(12) United States Patent
Aldeghi et al.

(10) Patent No.: US 7,526,157 B2
(45) Date of Patent: Apr. 28, 2009

(54) POINT-TO-POINT OPTICAL FIBRE LINK

(75) Inventors: Roberto Aldeghi, Milan (IT); Pierluigi Franco, Milan (IT); Giorgio Grasso, Milan (IT); Marco Romagnoli, Milan (IT); Francesco Tassone, Milan (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 11/791,611

(22) PCT Filed: Dec. 6, 2004

(86) PCT No.: PCT/IT2004/000675

§ 371 (c)(1),
(2), (4) Date: May 2, 2008

(87) PCT Pub. No.: WO2006/061857

PCT Pub. Date: Jun. 15, 2006

(65) Prior Publication Data

US 2008/0219621 A1  Sep. 11, 2008

(51) Int. Cl.
*G02B 6/26* (2006.01)
*G02B 6/42* (2006.01)

(52) U.S. Cl. .................................................. 385/32
(58) Field of Classification Search .............. 385/15, 385/32
See application file for complete search history.

(56) References Cited

U.S. PATENT DOCUMENTS 4,696,534 A   9/1987   Saha
4,696,535 A   9/1987   Saha (Continued)

FOREIGN PATENT DOCUMENTS

DE        42 43 400 A1    6/1994

(Continued)

OTHER PUBLICATIONS

Loke et al.; "Simulation and Measurement of Radiation Loss at Multimode Fiber Macrobends"; Journal of Lightwave Technology, vol. 8, No. 8, pp. 1250-1256, (1990).

*Primary Examiner*—Sung H Pak
*Assistant Examiner*—Daniel Petkovsek
(74) *Attorney, Agent, or Firm*—Finnegan, Henderson, Farabow, Garrett & Dunner, L.L.P.

(57) ABSTRACT

Point-to-point link for the transmission of digital signals includes two opto-electronic conversion apparatuses and an optical cable including at least one optical fiber having two terminal portions, each opto-electronic conversion apparatus including an opto-electronic device optically coupled to a respective terminal portion between the two terminal portions of the at least one optical fiber, wherein at least one of the two opto-electronic conversion apparatuses is adapted to keep the respective terminal portion of the optical fiber in bent position with a bending radius R, where 1.5 mm$\leq$R$\leq$2.5 mm, and to keep the respective opto-electronic device optically coupled to the bent terminal portion in order to allow the transmission of the digital signals between the optical fiber and the at least one of the two opto-electronic conversion apparatuses; and at least the bent terminal portion of the at least one optical fiber is such as to satisfy the following relationship r/R<0.07*n/(35+n), where n is the stress corrosion susceptibility factor and r is the radius of the cladding of the optical fiber.

22 Claims, 8 Drawing Sheets

U.S. PATENT DOCUMENTS

| | | |
|---|---|---|
| 4,728,169 A | 3/1988 | Campbell et al. |
| 4,768,854 A | 9/1988 | Campbell et al. |
| 4,877,306 A * | 10/1989 | Kar ........................... 385/128 |
| 4,950,046 A | 8/1990 | Hughes et al. |
| 5,009,479 A | 4/1991 | Morrison |
| 6,258,404 B1 | 7/2001 | Morgand et al. |
| 6,475,620 B1 | 11/2002 | Ruello et al. |
| 6,909,821 B2 * | 6/2005 | Ravasio et al. ................ 385/24 |

FOREIGN PATENT DOCUMENTS

| | | |
|---|---|---|
| GB | 2 236 405 A | 4/1991 |
| WO | WO-01/50644 A1 | 7/2001 |

* cited by examiner

POINT-TO-POINT OPTICAL FIBRE LINK

CROSS REFERENCE TO RELATED APPLICATION

This application is a national phase application based on PCT/IT2004/000675, filed Dec. 6, 2004, the content of which is incorporated herein by reference.

BACKGROUND OF THE INVENTION

1. Field of the Invention

The present invention relates to a point-to-point optical fiber link for transmitting digital signals from and towards a user apparatus, within a network for distributing signals to a plurality of users.

The present invention also relates to a network for distributing signals to a plurality of users and a method for connecting, in a signal distribution network, an optical cable to an opto-electronic conversion device.

2. Description of the Related Art

Currently, in the field of telecommunications, optical technology is mainly used for long-distance transmission of optical signals wherein the known properties of wide band offered by optical fibers are exploited. For the transmission of signals (such as digital television, telephone and/or data signals) from and towards users and the transmission of digital data between electrical apparatuses (such as Personal Computers) of a Local Area Network (LAN), the technology mainly used is, however, that in which electrical cables, such as coaxial cables or cables consisting of copper pairs, are used.

However, electrical cables have a relatively narrow band and are becoming a bottleneck with respect to the band of the signals to be transmitted. Moreover, they have problems of electromagnetic interference, of impedance matching and are difficult to insert into the suitable raceways of a building since they are rigid. Moreover, since they are bulky, they substantially limit the number of cables that can be inserted in a raceway. Moreover, for electrical safety requirements, they require the provision of separate raceways from those used for the distribution of electrical energy.

Research interest is therefore steering towards the possibility of using optics not only in the long-distance signal transmission, but also in networks for distributing signals from a common branching point to a plurality of user apparatuses. Fiber optic cables, indeed, are suitable for being inserted in the suitable raceways of a building since they are not too bulky, are flexible, light, free from electromagnetic interference and have low bending loss. Moreover, they are suitable for being inserted in the same raceways used for the distribution of electrical energy. Moreover, optical fibers potentially have a very wide band, low attenuation values and they are transparent to the bit rate, format and transmission code.

However, for the connection to electrical apparatuses, fiber optic cables require the use of opto-electronic devices to convert the optical signals transported thereby into corresponding electrical signals and vice-versa.

Throughout the present description and claims the expression "opto-electronic conversion" is used to indicate an optical-electric and/or electric-optical conversion.

The conversion of an optical signal into a corresponding electrical signal is conventionally carried out through a photodetector whereas the conversion of an electrical signal into a corresponding optical signal is conventionally carried out by modulating the intensity of a light emitted by a light source according to the information transported by the electrical signal.

The connection of an optical fiber to a light source and/or to a photodetector is conventionally carried out through an optical connector. Typically, an optical connector is a device comprising two parts that can be repeatedly connected and disconnected to each other and that must be attached one to an end of the optical fiber and the other one to a pig-tail of the light source or of the photoreceiver.

For example, the installation of an optical cable comprising an optical fiber, suitable for implementing a point-to-point link within a building, between a user apparatus and a distribution unit (situated, for example, in an office or apartment and, respectively, in the cellar or loft) requires the following steps to be performed: passage of the optical cable along a suitable raceway of the building; cutting of the optical cable according to the necessary length; application of the connectors to the two ends of the optical fiber at the user apparatus and at the distribution unit; possible application of the connectors to a light source and to a photodetector (in the case in which the light source and the photodetector are not already equipped with connectors); and, finally, connection through the connectors of one end of the fiber to the light source and of the other end of the fiber to the photodetector, at the distribution unit and at the user apparatus side.

An alternative known technique for connecting an optical fiber to an opto-electronic device is a fused junction between an end of the optical fiber and a pigtail of the opto-electronic device.

However, both optical connectors and fused junction require the use of fiber stripping (elimination of the protective outer coating), cleaving and polishing operations, which are very delicate to carry out on site, require high precision (in the range of micrometers), highly specialized personnel and tools and thus involve high installation times and costs. Moreover, these types of operations must be carried out at the premises of the user, very often in inconvenient and narrow spaces (for example, under a table or desk).

Therefore, although fiber optic cables have numerous advantages, their use in networks for distributing signals to a plurality of users has up to now been highly limited both due to the high installation costs and because the optical connection may be unreliable if the aforementioned operations are not carried out correctly.

In order to solve this problem, WO 01/50644 describes a signal distribution network comprising fiber optic cables that are electrically terminated, i.e. having at least one end permanently connected to an opto-electronic terminal portion.

However, this solution has the disadvantage of requiring lager spaces for the passage of the opto-electronic termination along the raceways of a building with respect to those required by the cable not yet opto-electronically terminated. Moreover, also in the case in which the cable is electrically terminated at just one end, such a solution still requires the use of highly specialized personnel and tools to connect the other end of the cable to an opto-electronic termination.

Therefore, the Applicant faced the problem of reducing the installation costs of a fiber optic network for distributing signals to a plurality of users.

The Applicant has found that such a problem can be solved by using a technique that allows an optical signal to be extracted and injected from/into a fiber through suitable bending of the optical fiber. Indeed, the Applicant has observed that with this technique the optical fibers can be used, for the terminations, complete with their protective coating, provided that the same is sufficiently transparent;

that the terminal face of the optical fiber carries out no optical function and that the aforementioned critical stripping, cleaving and polishing operations of the fiber, required by the use of optical connectors or fused junctions, are eliminated. Moreover, by using a suitable locking mechanism to keep the fiber bent and in optical alignment position with respect to the opto-electronic device, the connection operations of the optical fiber to the opto-electronic device can be carried out by any technician, even if not specialized in optical cable terminations, or, indeed, even by the final user.

Extraction and injection techniques from/into fiber of an optical signal through bending of the optical fiber are known in the art.

For example, U.S. Pat. No. 4,950,046, GB 2 236 405, U.S. Pat. Nos. 4,696,534 and 4,696,535 describe devices for extracting and/or injecting light in fiber through bending of the same to be used to locally inject out and/or tap optical signals in order to carry out an active alignment of two waveguides or optical fibers or to detect whether an optical signal is present in an optical fiber, for example during maintenance.

U.S. Pat. No. 4,950,046 describes a device in which the fiber is bent with a banding radius R equal to 2.8 mm; GB 2 236 405 describes a bending radius R comprised between 1 and 3 mm; U.S. Pat. No. 4,696,534 describes a bending radius R comprised between 3 and 10 mm and U.S. Pat. No. 4,696,535 describes a bending radius R comprised between 3 and 10 mm.

Moreover, Loke et al. ("Simulation and measurement of radiation loss at multimode fiber macrobends", Journal of Lightwave Technology, Vol. 8, No. 8, August 1990, pages 1250-1256), show the results of simulations and experiments carried out to determine the macro-bending losses of multimode fibers. They show that the macro-bending losses of an optical fiber are inversely proportional to the bending radius R.

The Applicant has observed that both the injection efficiency and the extraction efficiency of an optical signal into/from a bent optical fiber increase as the bending radius decreases. However, too small bending radii (for example between 1 and 2.5 mm) subject the optical fiber to high stresses that can lead in time to the breaking thereof.

Therefore, although the solutions described by the aforementioned patent documents can be used for the applications described therein, in which the optical fiber must be kept in bent position only for the time required by the specific application (i.e. just for the duration of the active alignment operation or of the maintenance operation to be carried out), they are not suitable for being used for long-lasting applications. In particular, they are not adapted to be used in an optical signal distribution network that uses a fiber optic point-to-point link, to connect the ends of the optical fiber to the opto-electronic conversion apparatuses where the optical fiber must be kept in bent position for the lifetime of the point-to-point link.

U.S. Pat. No. 4,768,854 describes the use of the fiber bending technique to extract and inject an optical signal in a signal distribution network comprising non-destructive read taps arranged in series which create extremely small attenuations of an optical signal being tapped. In this document it is stated that a permanent bend in a multi-mode optical fiber that has a minimum bend radius of 3.5 mm over a 45° sector angle creates less than a 10% chance of fracturing the fiber section in 20 years, and a 3.8 mm minimum bend radius over a 45° sector angle creates less than $1.5*10^{-2}$% chance of fracturing the fiber section in 20 years. Moreover, it is stated that bend radii equal to or greater than 4.2 and 4.5 mm result in much lower breaking probability.

The Applicant observes that this document teaches to use bending radii of more than 3.5 mm and preferably more than 4.2 mm to obtain breaking probability values of less than 10% in 20 years to the detriment, however, of the extraction and injection efficiency of the optical signal from/into fiber.

Therefore, the Applicant faced the technical problem of reducing the installation costs of a network for distributing signals to a plurality of user electrical apparatuses in an effective and reliable manner.

SUMMARY OF THE INVENTION

In a first aspect thereof, the present invention thus relates to a point-to-point link for the transmission of digital signals comprising two opto-electronic conversion apparatuses and an optical cable comprising at least one optical fiber having two terminal portions, each opto-electronic conversion apparatus comprising an opto-electronic device, the two opto-electronic devices being respectively optically coupled to the two terminal portions of said at least one optical fiber, characterized in that at least one of the two opto-electronic conversion apparatuses is adapted to keep the respective terminal portion of the optical fiber in bent position with a bending radius R, where $1.5\ mm \leq R \leq 2.5\ mm$ and to keep the respective opto-electronic device optically coupled to the respective bent terminal portion in order to allow the transmission of said digital signals between said optical fiber and the opto-electronic conversion apparatus; and in that at least the bent terminal portion of said at least one optical fiber is such as to satisfy the following relationship $r/R < 0.07*n/(35+n)$, where n is the stress corrosion susceptibility factor and r is the radius of the optical fiber cladding.

The point-to-point link according to the invention—by using a technique that allows an optical signal to be extracted and/or injected from/into fiber through suitable bending of the optical fiber—allows the installation costs to be reduced. Indeed, as already stated above, this technique allows the aforementioned critical stripping, cleaving and polishing operations of the fiber to be eliminated and, by using a suitable locking mechanism to keep the fiber bent and in optically alignment position with respect to the opto-electronic device, allows any technician, or even the final user, to carry out the connection operations of the optical fiber to the opto-electronic device.

Moreover, by using bending radii R of the fiber of between 1.5 and 2.5 mm and a fiber that satisfies, at least in the bent terminal portion, the aforementioned relationship $r/R < 0.07*n/(35+n)$, the point-to-point link according to the invention allows high efficiencies of injection and extraction (suitable for modern high bit-rate transmission systems) and at the same time good reliability to be obtained, as shall be shown later on.

Indeed, the Applicant has observed that the optical fibers that satisfy the aforementioned relationship allow the IEC 60793-1-B7 (A-B-C-D-E) system requirements to be satisfied. That is, they allow no more than 1 breaking out of 1000 links in a year to be obtained, calculated on point-to-point links in which both an injection of an optical signal and a extraction of an optical signal is carried out through bent fiber.

Moreover, the Applicant has observed that the use of bending radii R of the fiber of between 1.5 and 2.5 mm allow the requirements on the positioning tolerances of the opto-electronic device with respect to the bent terminal portion of the optical fiber to be relaxed, as described below. This is particularly advantageous when the opto-electronic device is a light source. Indeed, in general, a light source focused with a suitable system has a very small spot size that thus needs to be directed with precision onto the transmission fiber. The larger size of the sensitive surface of a photoreceiver make the pick-up operation of the light coming from the bent fiber less critical with respect to the injection operation.

Advantageously, the bending radius R is less than 2.2 mm. Preferably, the bending radius R is less than or equal to 2 mm. Advantageously, the bending radius R is about equal to 1.5 mm.

Preferably, said at least one optical fiber is multi-mode.

For the purposes of the present invention, the expression "multi-mode optical fiber" is used to indicate an optical fiber adapted to propagate more than about ten modes, typically more than about twenty modes, at the wavelengths considered by the present invention (described below). Preferably the multi-mode optical fiber has high modal band performance through a suitable index profile adapted to propagate, at the operating wavelength, several modes at approximately the same speed, for example through an essentially parabolic profile.

The use of multi-mode optical fibers is advantageous because they typically have much larger cores than single mode fibers. The alignment operations of the opto-electronic components and/or of the coupling optics of the terminations to said fibers, as well as the mechanical coupling operations between said fibers on site are advantageously made easier with respect to single mode fibers. Moreover, multi-mode optical fibers can advantageously be used with laser sources and photoreceivers operating at around 850 nm that are much less expensive with respect to those operating at around 1300 or 1550 nm, typically used with conventional single-mode optical fibers.

Advantageously, said optical fiber has glass core and cladding. Preferably, the core of said optical fiber has a diameter less than or equal to about 62.5 μm. More preferably, said diameter is between about 50 μm and 62.5 μm.

Moreover, the external diameter of the cladding is typically about 125 μm. Advantageously, it is less than 125 μm. Preferably, said diameter is between 80 μm and 125 μm. Even more preferably, said diameter is about 100 μm. Advantageously, said optical fiber, terminal portions included, has a protective outer coating made from polymeric material. Typically, the diameter of the protective outer coating is about 250 μm.

The Applicant observes that optical fibers currently used in signal distribution networks have colored coatings, in order to identify them, which can introduce significant attenuations at the transmission wavelengths. Advantageously, the protective outer coating of the optical fiber of the point-to-point link according to the invention is transparent at least at the bent portion of the fiber. This advantageously allows the losses undergone by the extracted and/or injected light at the bent terminal portion to be limited. Advantageously, the outer coating of said at least one optical fiber is such as to introduce an attenuation at the operating wavelength of less than 1 dB, wherein by attenuation it is meant the attenuation undergone by the light to pass through the entire thickness of the coating in a direction normal to the axis of the fiber.

Advantageously, the refractive index of this protective outer coating is greater than that of the cladding of the fiber, and preferably it is not much greater than it so that excessive reflections at the interface between cladding and coatings are avoided. Typically, this refractive index is not greater than 0.1 with respect to that of the cladding.

Preferably, the parameter n is equal to at least 20. More preferably, the parameter n is equal to at least 22. Even more preferably, the parameter n is equal to at least 25.

Advantageously, the fiber is bent by an arc of circumference corresponding to a bending angle of between 20 and 180°. The Applicant observes that, in general, a smaller arc of circumference corresponds to a lower probability of fiber breaking.

Advantageously, both the opto-electronic conversion apparatuses are adapted to keep the relative terminal portions of the optical fiber in bent position with a bending radius R, wherein 1.5 mm≦R≦2.5 mm, and to keep the respective opto-electronic devices optically coupled to the respective bent terminal portion in order to allow the transmission of said digital signals between said optical fiber and said opto-electronic conversion apparatuses. Moreover, both terminal portions of said at least one optical fiber are advantageously such as to satisfy the aforementioned relationship $r/R < 0.07 \cdot n/(35+n)$.

This solution, in which both opto-electronic conversion apparatuses are made according to the invention, is advantageous since it allows the installation costs to be further reduced.

Advantageously, said at least one opto-electronic conversion apparatus adapted to keep the terminal portion of the optical fiber in bent position comprises a locking mechanism adapted to keep the terminal portion of the optical fiber in bent position and in optical alignment position with respect to the opto-electronic device. The locking mechanism is advantageously adapted to releasably keep the terminal portion of the optical fiber in bent position.

In an embodiment, the opto-electronic device is a light source. Typical examples of suitable light sources are Fabry-Perot lasers and VCSEL (vertical cavity surface emitting laser) lasers. Advantageously, said laser source is a transversal single mode source.

In an embodiment, the opto-electronic device is a photodetector. Typically, said photodetector is a photodiode. Preferably, it is a PIN type photodiode.

Advantageously, the opto-electronic conversion apparatus also comprises focusing optics in order to improve the light coupling between the bent terminal portion and the opto-electronic device associated with it. For example, the focusing optics comprises a spherical optical lens. The focusing optics can also comprise aspherical surfaces, that is, adapted to reduce the spherical aberration of the optical focusing system. These aberrations, indeed, could deteriorate both the coupling efficiency and the positioning tolerances of the elements of the system.

Advantageously, the opto-electronic conversion apparatus also comprises a mode scrambler associated with the bent terminal portion of the optical fiber. Preferably, the mode scrambler is associated with the terminal portion of the optical fiber, before the bent part. The Applicant observes that such a device allows the light coupling efficiency between the bent portion and the opto-electronic device to be improved. Advantageously, the mode scrambler is associated with the bent terminal portion of the optical fiber with which a photodetector is associated.

Typically, the point-to-point link is bidirectional. That is, it is adapted to transport digital optical signals traveling in opposite directions (from and towards the user). The two optical signals in the two opposite directions can travel along two different optical fibers or along the same optical fiber using, for example, two different wavelengths for the two directions and a wavelength division multiplexing. The solution with two different optical fibers is particularly advantageous in the case of use of multi-mode optical fibers.

In the case of a two-way point-to-point link, each opto-electronic conversion apparatus advantageously comprises a second opto-electronic device. In the case in which the two optical signals traveling in the two opposite directions are transmitted along the same optical fiber, said at least one opto-electronic conversion apparatus, adapted to keep the respective terminal portion of the optical fiber in bent position, is also adapted to keep the respective second opto-electronic device optically coupled to said bent terminal portion.

According to a preferred two-way embodiment of the invention, the optical cable comprises a second optical fiber having two terminal portions respectively connected to the two opto-electronic conversion apparatuses.

As far as the structural and functional features of the second optical fiber are concerned reference is made to that already described above regarding the first optical fiber.

According to this two-way embodiment, said at least one opto-electronic conversion apparatus, adapted to keep the respective terminal portion of the first optical fiber in bent position, is also adapted to keep the respective terminal portion of the second optical fiber in bent position with a bending radius R, where 1.5 mm≦R≦2.5 mm and to keep the second opto-electronic device optically coupled to the bent terminal portion of the second optical fiber in order to allow the transmission of said digital signals between said second optical fiber and said opto-electronic conversion apparatus. Moreover, also at least the bent terminal, portion of the second optical fiber is such as to satisfy the aforementioned relationship r/R<0.07*n/(35+n).

Advantageously, said opto-electronic conversion apparatus comprises a locking mechanism adapted to keep the terminal portions of the first and second optical fiber in bent position and in optical alignment position with respect to the opto-electronic devices. Typically, one of the two opto-electronic devices is a light source and the other is a photodetector. Advantageously, the locking mechanism is suitable for releasably keeping the terminal portions of optical fiber in bent position.

As far as the preferred features of the light source and of the photodetector are concerned reference is made to what already described above.

Advantageously, the aforementioned opto-electronic conversion apparatus also comprises focusing optics in order to improve the light coupling between the two bent terminal portions of the first and second optical fiber and the respective opto-electronic devices. For example, the focusing optics comprises two spherical optical lenses. The focusing optics can also comprise spherical surfaces, that is, suitable for reducing the spherical aberration of the optical focusing system. These aberrations, indeed, could deteriorate both the coupling efficiency and the positioning tolerances of the elements of the system.

Advantageously, the aforementioned opto-electronic apparatus also comprises at least one mode scrambler associated with one of the two bent terminal portions, before the bent part. Advantageously, the mode scrambler is associated with the bent terminal portion of the optical fiber to which the photodetector is optically coupled.

Advantageously, both opto-electronic conversion apparatuses are adapted to keep both relative terminal portions of the first and second optical fiber in bent position with a bending radius R, where 1.5 mm≦R≦2.5 mm and to keep the respective opto-electronic devices optically coupled respectively to the bent terminal portion of the first and second optical fiber, in order to allow the transmission of said digital signals between the first and the second optical fiber and said opto-electronic conversion apparatuses. Moreover, both of the terminal portions of the first optical fiber and of the second optical fiber are advantageously such as to satisfy the aforementioned relationship r/R<0.07*n/(35+n).

Also in the two-way case, the solution in which both of the opto-electronic conversion apparatuses are made according to the invention is advantageous since it allows the installation costs at both sides of the point-to-point link to be reduced.

Typically, in view of the use foreseen for the transmission of signals from and towards the final user in a signal distribution network, said optical cable has a length of no more than 5 km. Advantageously, it has a length of no more than 2 Km. Typically, it has a length of no more than 1 Km. For example, it has a length of 500, 100, 50 or 20 m.

Advantageously, the point-to-point link is adapted to transmit digital optical signals at a wavelength of about 850 nm.

According to an embodiment, the point-to-point link is adapted to transmit digital optical signals at a wavelength of about 1310 nm.

According to an embodiment, the point-to-point link is adapted to transmit digital optical signals at a wavelength of about 1550 nm.

Advantageously, the point-to-point link is adapted to transmit digital optical signals at a bit rate higher than 10 Mbit/s. Preferably, the point-to-point link is adapted to transmit digital optical signals at a bit rate higher than 50 Mbit/s. More preferably, the point-to-point link is adapted to transmit digital optical signals at a bit rate of at least 100 Mbit/s. Even more preferably, the point-to-point link is adapted to transmit digital optical signals at a bit rate of at least 1 Gbit/s. Typically, the bit rate of the transmitted signal is no more than 2.5 Gbit/s.

According to the applications (for example in typical office applications) the optical cable can comprise, along its path, at least one optical connector or fused junction to connect two or more portions of the point-to-point link, as explained in detail later on.

In a second aspect thereof, the present invention also relates to a network for distributing digital signals to a plurality of user apparatuses, said network comprising
  a distribution unit having a plurality of electrical ports, and
  a plurality of point-to-point links each connected to at least one respective electrical port of the distribution unit so as to put said distribution unit in communication with said plurality of user apparatuses; each point-to-point link comprising two opto-electronic conversion apparatuses and an optical cable comprising at least one optical fiber having two terminal portions, each opto-electronic conversion apparatus comprising an opto-electronic device optically coupled to a respective terminal portion between said two terminal portions of said at least one optical fiber, characterized in that at least one of the two opto-electronic conversion apparatuses of each point-to-point link is adapted to keep the respective terminal portion of the optical fiber in bent position with a bending radius R, where 1.5 mm≦R≦2.5 mm and to keep the respective opto-electronic device optically coupled to said bent terminal portion in order to allow the transmission of said digital signals between said optical fiber and said opto-electronic conversion apparatus.

In a third aspect thereof, the present invention also relates to a method for connecting—in a signal distribution network—an optical cable to an opto-electronic conversion device for the transmission of digital signals in said distribution network, said optical cable comprising a cable jacket and at least one optical fiber, said method comprising the steps of
a) removing the cable jacket at a terminal portion of said at least one optical fiber;
b) inserting the terminal portion of said at least one optical fiber, stripped of the cable jacket, into a housing adapted to keep said terminal portion in bent position with a bending radius R, where 1.5 mm≦R≦2.5 mm, and to keep the opto-electronic conversion device in optical coupling position with respect to the bent terminal portion, at least the bent terminal portion of said at least one optical fiber being such as to satisfy the following relationship $r/R<0.07*n/(35+n)$, where n is the stress corrosion susceptibility factor and r is the radius of the cladding of the optical fiber.

Typically, said method also comprises the step of cutting the optical cable so as to obtain the required length, in step a) the cable jacket being removed at the cut end of the cable.

Typically, the optical fiber has a protective outer coating.

Advantageously, in step b) the terminal portion of said at least one optical fiber is inserted in the housing, provided with its protective outer coating.

BRIEF DESCRIPTION OF THE DRAWINGS

Further characteristics and advantages of the present invention shall become clearer from the following detailed description of a preferred embodiment thereof, made with reference to the attached drawings. In such drawings, FIG. 1 schematically shows a first embodiment of an opto-electronic conversion apparatus adapted to be used in a point-to-point link according to the invention.

DETAILED DESCRIPTION OF THE INVENTION

Figure 3:
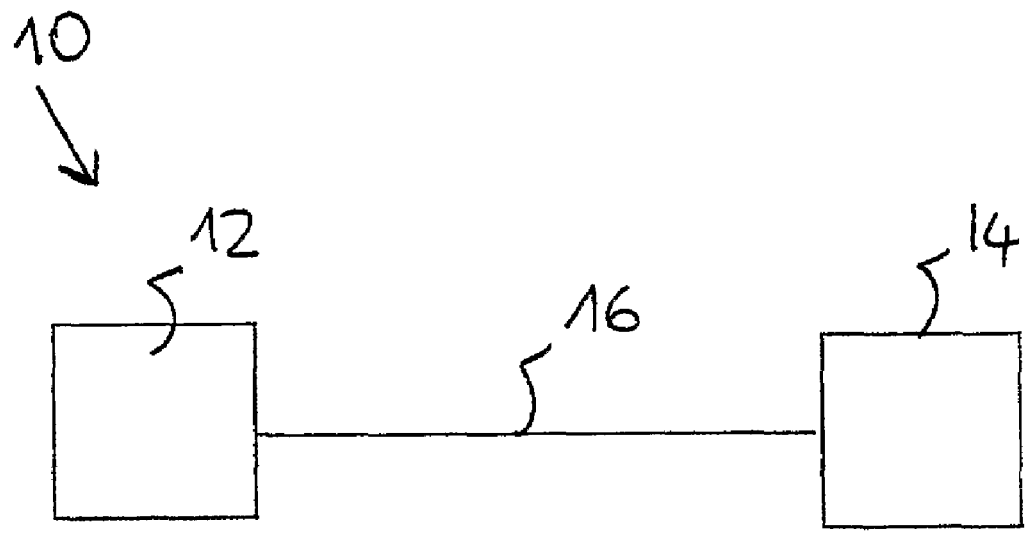
FIG. 3 schematically shows a first embodiment of a point-to-point link according to the invention.

FIG. 3 shows an embodiment of a point-to-point link 10 according to the invention comprising a first and a second opto-electronic conversion apparatus 12, 14 and an optical cable (not shown) in turn comprising an optical fiber 16. The optical fiber 16 has two terminal portions 1 respectively connected to the two opto-electronic conversion apparatuses 12, 14.

The optical fiber 16 is advantageously a multi-mode glass optical fiber comprising a core, a cladding and a protective outer coating. For example, the optical fiber 16 has an approximately parabolic index profile, the core with a diameter of 50 µm, the cladding with an external diameter of 125 µm and the outer coating (typically a double layer coating) with an overall external diameter of 250 µm.

The first opto-electronic conversion apparatus 12 is suitable for receiving a digital electrical input signal, for converting the digital electrical signal into a corresponding optical signal transporting the same digital information, according to known techniques, and for injecting the optical signal into the optical fiber 16.

The second opto-electronic conversion apparatus 14 is suitable for extracting the digital optical signal coming from the optical fiber 16, for converting the optical signal extracted into a corresponding digital electrical signal, according to known techniques, and for providing the electrical signal in output.

Figure 1:
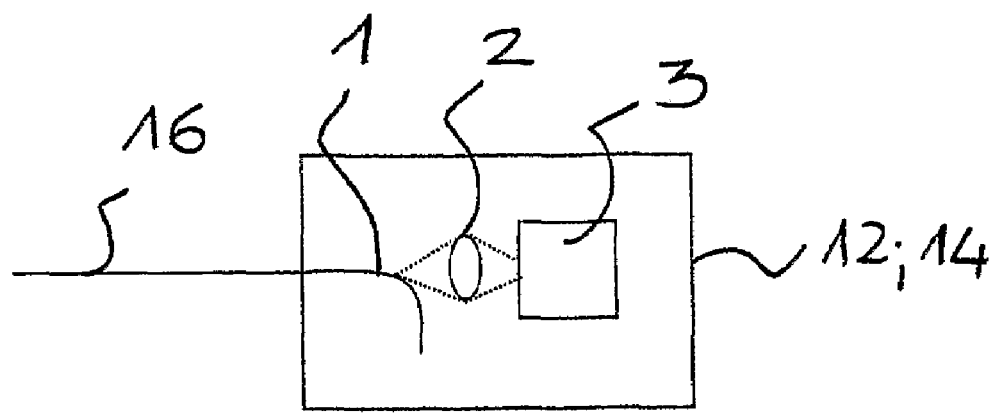

According to the invention, at least one of the two opto-electronic conversion apparatuses is made according to the structure shown schematically in FIG. 1. Advantageously, the opto-electronic conversion apparatus made according to the structure shown in FIG. 1 is that which must be connected to an electrical apparatus (e.g. a Personal Computer) of a final user.

Advantageously, both of the opto-electronic conversion apparatuses 12, 14 are made according to the structure shown schematically in FIG. 1.

According to the structure shown in FIG. 1, the opto-electronic conversion apparatus 12; 14 is suitable for carrying out the injection or extraction of the digital optical signal into or from said optical fiber 16 by keeping the terminal portion 1 of the optical fiber 16 in bent position with a bending radius R.

Advantageously, the bending radius R is less than or equal to 2.5 mm in order to obtain high efficiencies of extraction and inject ion, as shall be shown later on. Moreover, the bending radius R is advantageously at least equal to 1.5 mm so that the optical fiber is not subjected to too high stresses.

The fiber is also bent by an arc of circumference corresponding to a bending angle advantageously comprised between 20-180°. The Applicant observes that, in general, a smaller arc of circumference corresponds to a lower probability of fiber breaking.

Moreover, according to the present invention, at least the bent terminal portion 1 and, advantageously, the entire optical fiber 16, is such as to satisfy the relationship $r/R<0.07*n/(35+n)$.

Figure 7:
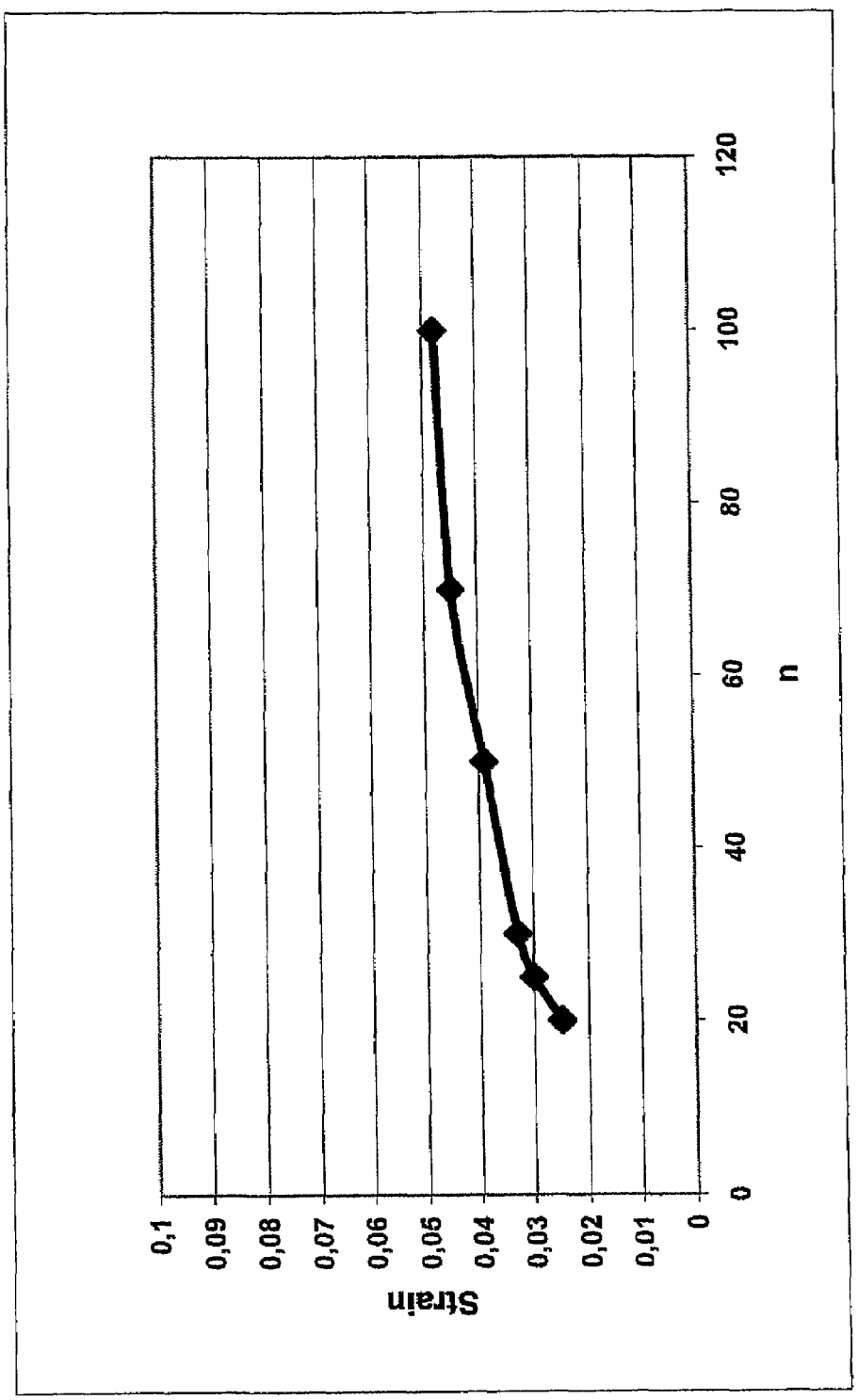
FIG. 7 shows the strain values of the bent optical fiber (expressed as a ratio between the radius r of the cladding of the fiber and the bending radius R of the fiber) versus the parameter n, that allow 1 break in 1 year out of 1000 point-to-point links to be obtained.

FIG. 7 shows the strain values of the bent optical fiber (expressed as the ratio between the radius r of the cladding of the fiber and the bending radius R of the fiber) versus the parameter n, that allow 1 break in a year out of 1000 point-to-point links (that is, out of 1000 links in which both an extraction operation and an injection operation are carried out through optical fiber bending) to be obtained. Such values were obtained by the Applicant through model COST 218 WG, known in the art. Once a bending radius value R has been selected within the range 1.5-2.5 mm, the optical fibers that satisfy the relationship $r/R<0.07*n/(35+n)$ allow a reliable system (no more than 1 break per year out of 1000 point-to-point links terminated at the two ends with bent fiber) and, at the same time, a high light extraction and injection efficiency through bent fiber to be obtained.

For example, considering a conventional fiber having a cladding diameter of 125 μm (r=62.5 μm) and a value of n equal to 20, it is necessary to bend the optical fiber using a bending radius of at least 2.5 mm to ensure no more than 1 break out of 1000 point-to-point links in a year. To use bending radii of less than 2.5 mm (so as to improve the extraction and injection efficiency) at the same time maintaining the breaking probability not higher than 1 out of 1000 point-to-point links in a year, it is necessary—according to the relationship r/R<0.07*n/(35+n)—to use optical fibers having values of n of more than 20 and/or a diameter of the cladding of less than 125 μm.

Optical fibers having a smaller cladding diameter (for example equal to 100 μm) can be obtained in a way known to the man skilled in the art by suitably controlling the production process of the preform and the drawing process of the optical fiber.

Optical fibers having a value of the parameter n of more than 20 can be obtained according to techniques known to the man skilled in the art, for example using specific compounds to make the outer coating of the fiber (for example, acrylphosphate or meta-acrylphosphate) and/or by coating the outer surface of the cladding of the fiber with a further suitable protective coating, for example of boron nitride. See, for example, what described by documents U.S. Pat. Nos. 6,258,404 and 6,475,620. Indeed, the Applicant has found that the coatings described in these documents allow coatings with the transparency values indicated above to be obtained.

Reverting to the embodiment shown in FIG. 1, the opto-electronic conversion apparatus 12; 14 comprises the terminal portion 1 of the optical fiber 16, an opto-electronic device 3 and, preferably, focusing optics 2. Moreover, it comprises a suitable locking mechanism (not shown) to keep the terminal portion 1 in bent position and in an optical alignment position with respect to the focusing optics 2 and to the opto-electronic device 3. Advantageously, the locking mechanism also allows the terminal portion 1 to be inserted and extracted into and from the opto-electronic conversion apparatus 12; 14 (for example, by means of a button that can be operated from the outside by a technician or by the user). This remarkably simplifies the connection between the optical fiber and the opto-electronic device.

Advantageously, a matching element having a refractive index similar, within a 0.05 limit, to that of the coating, and in any case no less than that of the cladding of the optical fiber, is arranged in contact with the protective outer coating at the curved portion of the fiber. Advantageously, this matching element can comprise a gelatinous or soft material that sticks to the protective outer coating of the fiber or a plastic material having the refractive index characteristics described above. This plastic matching element can be in a single piece with the aforementioned locking mechanism. Advantageously, this matching element is also transparent, such as to introduce an attenuation at the operating wavelength of less than 1 dB, wherein by attenuation it is meant the attenuation undergone by the light to pass through the entire thickness of said matching element.

According to whether the opto-electronic conversion apparatus 12; 14 carries out the injection or extraction of the optical signal from the fiber 16, the opto-electronic device 3 shall comprise a light source or a photoreceiver.

In the case of light extraction, the focusing optics 2 is advantageously suitable for focusing the light coming out from the optical fiber 16, at the bent terminal portion 1, on the sensitive surface of the photoreceiver. In general, the size of the sensitive surface of the photoreceiver decreases as the bit rate for which the photoreceiver is designed increases. Therefore, the focusing optics must, in general, be more accurate as the bit rate increases.

In the case of light injection, the focusing optics 2 is advantageously suitable for focusing the light coming out from the light source onto the optical fiber 16, at the bent terminal portion 1.

Figure 4:
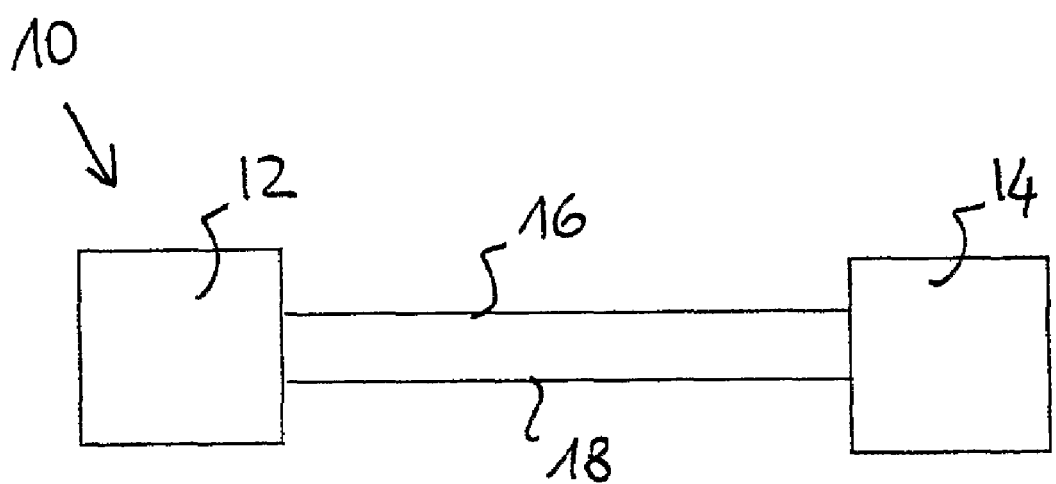
FIG. 4 schematically shows a second embodiment of a point-to-point link according to the invention.

FIG. 4 shows a two-way embodiment of a point-to-point link 10 according to the invention comprising a first and a second opto-electronic conversion apparatus 12, 14 and an optical cable (not shown) in turn comprising a first and a second optical fiber 16, 18. The optical fibers 16, 18 each have two terminal portions 1 respectively connected to the two opto-electronic conversion apparatuses 12, 14.

As far as the structural and functional characteristics of the optical fiber 18 are concerned reference is made to what described above regarding the optical fiber 16.

According to this embodiment, the first opto-electronic conversion apparatus 12 is suitable for receiving a digital electrical input signal, for converting the digital electrical signal into a corresponding optical signal transporting the same digital information, according to known techniques; and for injecting the optical signal into the first optical fiber 16. Moreover, it is suitable for extracting a digital optical signal coming from the second optical fiber 18, for converting the optical signal extracted into a corresponding digital electrical signal, according to known techniques, and for providing the electrical signal in output.

The second opto-electronic conversion apparatus 14 is suitable for extracting the digital optical signal coming from the first optical fiber 16, for converting the optical signal extracted into a corresponding digital electrical signal, according to known techniques, and for providing the electrical signal in output. Moreover, it is suitable for receiving a digital electrical input signal, for converting the digital electrical signal into a corresponding optical signal transporting the same digital information, according to known techniques, and for injecting the optical signal into the second optical fiber 18.

Figure 2:
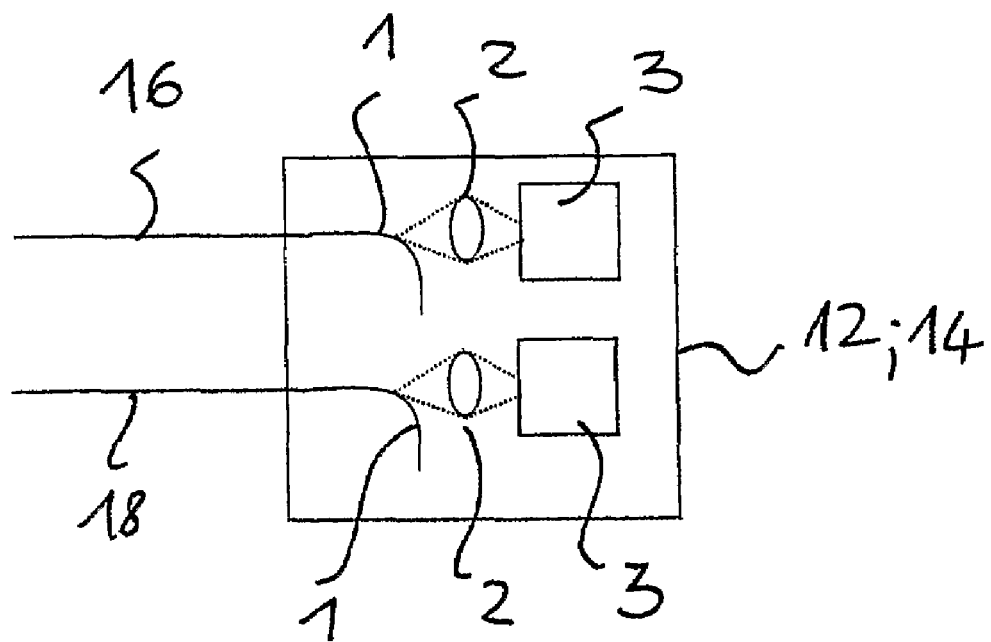
FIG. 2 schematically shows a second embodiment of an opto-electronic conversion apparatus adapted to be used in a point-to-point link according to the invention.

According to the invention, at least one of the two opto-electronic conversion apparatuses is made according to the structure shown schematically in FIG. 2. Advantageously, at least the opto-electronic conversion apparatus, which must be connected to an electrical apparatus (e.g. a Personal Computer) of a final user, is made according to the structure shown in FIG. 2.

Advantageously, both of the opto-electronic conversion apparatuses 12, 14 are made according to the structure shown schematically in FIG. 2.

According to the structure shown in FIG. 2, the opto-electronic conversion apparatus 12; 14 is suitable for carrying out the injection and extraction of the digital optical signal into and from said optical fibers 16, 18 by keeping their terminal portions 1 in bent position with a bending radius R, where $1.5\ \text{mm} \leq R \leq 2.5\ \text{mm}$.

Moreover, according to the present invention, at least the terminal portions 1 and, typically, the entire portion of the two optical fibers 16 and 18, are such as to satisfy the relationship r/R<0.07*n/(35+n).

In particular, according to the embodiment shown in FIG. 2, the opto-electronic conversion apparatus 12; 14 comprises two terminal portions 1 of the optical fibers 16, 18, two opto-electronic devices 3 and, preferably, two focusing optics 2 respectively associated with the two terminal portions 1. Moreover, the opto-electronic conversion apparatus 12; 14 also comprises a suitable locking mechanism (not shown) to keep the terminal portions 1 in bent position and in optical alignment position with respect to the respective opto-electronic devices 3 and to the respective focusing optics 2. Advantageously, the locking mechanism also allows the terminal portions 1 to be inserted and extracted into and from the opto-electronic conversion apparatus 12; 14 (for example, by means of a button that can be operated from the outside by a technician or by the user). This substantially simplifies the connection between the optical fiber and the opto-electronic device.

In each opto-electronic conversion apparatus 12; 14 one of the two opto-electronic devices 3 comprises a light source associated with one of the two optical fibers whereas the other comprises a photoreceiver associated with the other optical fiber.

Figure 5:
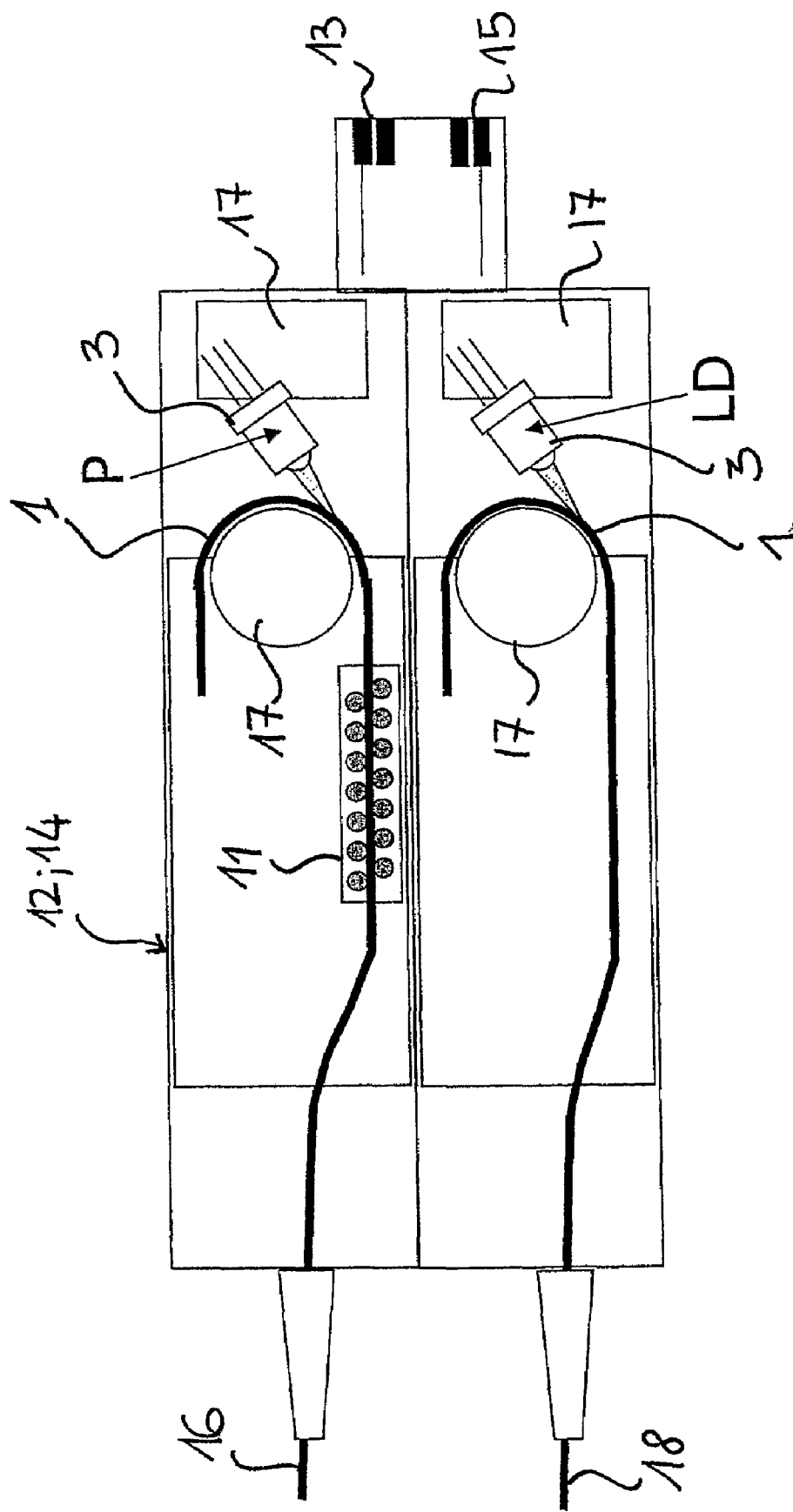
FIG. 5 schematically shows an exemplary implementation of the opto-electronic conversion apparatus of FIG. 2.

FIG. 5 shows an exemplary implementation of the opto-electronic conversion apparatus of FIG. 2 where the same reference numerals have been used for the same elements already included in the embodiment of FIG. 2.

In such a figure, as well as the elements already shown in FIG. 2, two electrical connectors 13, 15, a mode scrambler 11 associated with the optical fiber 16 and a locking mechanism 17 for keeping the two bent terminal portions 1 and the opto-electronic devices 3 in optical alignment position are schematically shown. The focusing optics has not been shown.

The two electrical connectors 13, 15 are respectively connected to the two opto-electronic devices 3 and allow connection to an electronic apparatus (e.g. a Personal Computer) of a final user. Typically, they are conventional connectors of the RJ45 type. Typically, each opto-electronic conversion apparatus 12; 14 comprises matching electronics (not shown) suitable for making the electrical signals of the opto-electronic devices 3 compatible with the typical impedances and voltages of commercial chips for optical fiber transmission of Ethernet protocol. Moreover, such matching electronics can also be suitable for carrying out more advanced functions (as protocol conversion) or network functions (e.g. switching).

In FIG. 5, the opto-electronic device 3 associated with the optical fiber 16 is a photoreceiver (PD) whereas the one associated with the optical fiber 18 is a light source (LD).

The mode scrambler 11 (optional) is a device of the known type that allows the light extraction efficiency from a bent fiber to be increased by exciting the propagation higher order modes of the multi-mode optical fiber upstream of the bent terminal portion 1, by favouring the light diffusion, during its propagation, towards the cladding of the fiber and thus easing the exit of such modes when the fiber is bent. In a configuration (not shown), the mode scrambler is associated, alternatively or in addition with respect to that which is shown in FIG. 5, with the optical fiber 18. It allows, in this case, the homogenization of the distribution of the injected optical power among the modes of the core of the fiber, which can be advantageous to ensure high transmission performance of the fiber in the cases in which the injection optics is such as to excite just those few modes having insufficient performance.

For example, the mode scrambler 11 comprises one or two corrugated surfaces between which the optical fiber is positioned. The corrugation has a period typically in the range of millimeters and a length of about one cm. The pressure exerted by the corrugated surfaces on the optical fiber in the mode scrambling region increases the excitation efficiency of the higher order modes without introducing significant losses up to an upper limit beyond which the injection losses begin to be significant.

Moreover, even if in the two-way embodiment illustrated in FIG. 4, the point-to-point link 10 comprises two optical fibers 16, 18, according to another two-way variant (not shown), the point-to-point link 10 comprises only one optical fiber, transporting optical signals traveling in opposite directions having, for example, two different wavelengths. According to this variant, both the light source and the photoreceiver of the opto-electronic conversion apparatus 12; 14 shall, for example, be optically coupled to the same bent terminal portion of the optical fiber.

The Applicant has carried out some simulations and measurements for showing the operation of the invention. The results of such simulations and measurements are reported hereafter.

Throughout the present description and claims, the expression "extraction efficiency" is used to indicate the ratio between the optical power of the light detected by a photoreceiver located at the bent fiber and the optical power of the light traveling in the fiber measured at a point near to (for example one cm distant) and upstream of the bent section. In turn, the expression "injection efficiency" is used to indicate the ratio between the power of the light emitted by a light source and the power of the light injected into optical fiber measured at a point near to (for example one cm distant) and downstream of the bent section.

Figure 6:
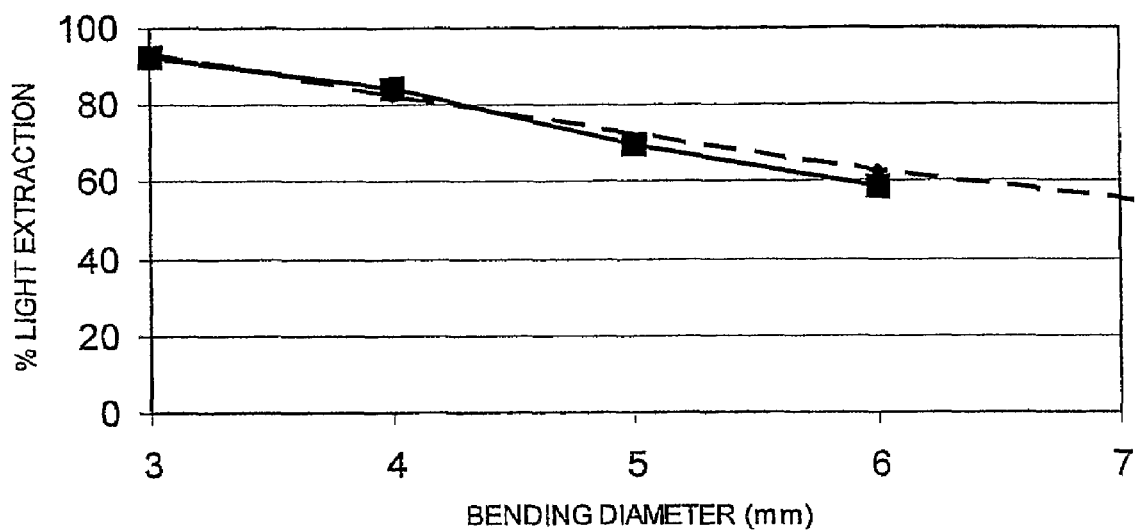
FIG. 6 shows the percentage of light extracted from a bent fiber versus the bending radius of the fiber obtained through experimental tests and simulations.

FIG. 6 shows the percentage of light extracted from a bent multi-mode optical fiber versus the bending diameter, obtained at 850 nm with a photodiode having a wide sensitive surface (1 cm$^2$), without focusing optics. The curve with the squares shows the results obtained through experimental measurements whereas the dashed curve shows the results obtained through simulations using ray optics. The multi-mode fiber considered for these and the following evaluations (tables 1-3 and 6-7) has the following exemplary characteristics:

core diameter=50 µm, parabolic refractive index of the core with maximum numerical aperture of 0.20;

silica cladding having diameter=125 µm, refractive index 1.447 at 1310 nm;

protective outer coating comprising a primary and a secondary coating;

primary outer coating diameter=180 µm, refractive index of 1.4693 at 1310 nm;

secondary outer coating diameter=250 µm refractive index of 1.5259 at 1310 nm;

matching element (made from plastic material) in contact with the protective outer coating having refractive index of 1.52 at 1310 nm, matched to that of the coating;

bandwidth at 850 nm=500 MHz*km;

maximum attenuation at 850 nm for fiber in cable=3.5 dB/km.

From FIG. 6 it can be seen how the efficiency of light extracted decreases with the bending diameter of the fiber and how the results obtained with the ray optics are in good agreement with the experimental results.

Table 1 below indicates the values of light extraction efficiency from a bent multi-mode optical fiber obtained—through simulations based upon a ray optics—for various bending radii of the optical fiber. In this case a low cost focusing optics has been considered (a conventional spherical lens having a diameter of 1.5 mm and a refractive index n of 1.491 at the wavelength of 1310 nm) to focus the light extracted from the bent fiber on a high performance photoreceiver having a diameter of the sensitive surface of 0.25 mm. Such a photoreceiver can be used up to a bit rate of 622 Mbit/s.

TABLE 1

| Fiber bending R (mm) | efficiency |
|---|---|
| 1.5 | 0.74 |
| 2 | 0.68 |
| 3 | 0.57 |
| 4 | 0.47 |

It can be seen that for bending radii comprised between 1.5 and 3 mm an efficiency of extraction of more than 50% is obtained even with a low-cost focusing optics.

Table 2 below shows values of the light injection efficiency on a bent multi-mode optical fiber obtained—through simulations based upon ray optics—for different bending radii of the optical fiber and considering focusing systems suitable for forming beams focused on the fiber having both relatively small spot sizes and, thus, relatively high divergence values ($\Delta\theta$) and relatively large spot sizes and, thus, relatively low divergence values ($\Delta\theta$).

TABLE 2

| | $\Delta\theta$ | | | | | | |
|---|---|---|---|---|---|---|---|
| | 10° | 8° | 5° | 4° | 3° | 2.5° | 2° |
| | | | | Spot size | | | |
| R | 8 µm | 10 µm | 16 µm | 20 µm | 24 µm | 32 µm | 40 µm |
| 1.5 | 0.16 | 0.25 | 0.48 | 0.53 | 0.53 | 0.36 | 0.26 |
| 2.0 | 0.11 | 0.19 | 0.37 | 0.43 | 0.44 | 0.31 | 0.22 |
| 3.0 | 0.076 | 0.12 | 0.25 | 0.30 | 0.32 | 0.23 | 0.16 |
| 4.0 | 0.052 | 0.08 | 0.19 | 0.22 | 0.25 | 0.18 | 0.13 |

It can be seen how, in general, for the same light source the injection efficiency increases as the bending radius of the optical fiber decreases. Moreover, it can be seen how, with the same bending radius, the injection efficiency varies as the spot size and the beam divergence vary and how there are divergence and spot size values that optimize the injection efficiency.

The Applicant observes that the results shown in Table 2, obtained with ray optics, remain qualitatively valid even when the wave-like nature of light is considered.

Figure 10:
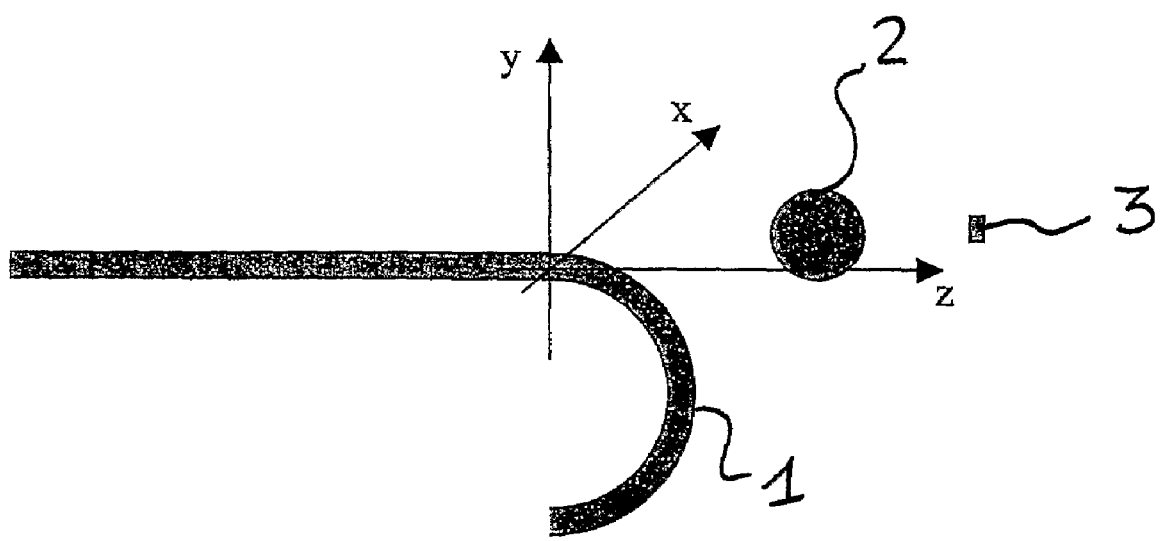
FIG. 10 shows the axes x, y and z considered in a simulation for identifying the positioning tolerances between a bent fiber terminal portion, a spherical lens and a light source.

Table 3 below shows the results of simulations carried out in order to identify the tolerances for the mechanical alignment between the light source and the terminal portion of bent optical fiber, with respect to the positioning that allows the maximum injection efficiency to be obtained for the system considered. For the simulations three types of laser sources (indicated in the first column) having different spot size values (the diameter of which is indicated in the second column) were considered. In particular, a single transversal mode Fabry Perot (FP) laser source, a transversal single mode (SM) VCSEL laser source and a transversal multi-mode (MM) VCSEL laser source (MM) were considered. Moreover, a bending radius of the fiber of 2 mm and a low-cost focusing optics (a conventional spherical lens having a diameter of 1.5 mm and refractive index n of 1.491 at a wavelength of 1310 nm) were considered. Column 3 shows the injection loss (IL) values (expressed as $10\log_{10}$ (injection efficiency)) obtained through an optimal positioning between the light source, the spherical lens and the terminal portion of bent optical fiber that allows the maximum injection efficiency to be obtained for the system considered. The fourth, fifth and sixth column show how much the light source can be displaced with respect to the optimal position along x, y and z axes (by keeping the fiber and the lens still) to have at most 3 dB of additional power losses, with respect to the injection loss values obtained through optimal positioning. The penultimate and last column, on the other hand, show how much the bent optical fiber can be displaced with respect to the optimal position along x and y axes (by keeping the light source and the lens still) to have at most 3 dB of additional power losses, with respect to the injection loss values obtained with optimal positioning. The x, y and z considered axes are shown in FIG. 10 where the terminal portion 1 of bent fiber, the spherical lens 2 and the light source 3 are shown.

TABLE 3

| LD type | LD diam [µm] | I.L. [dB] | x tol. [µm] | y tol. [µm] | z tol. [µm] | x tol. [µm] | y tol. [µm] |
|---|---|---|---|---|---|---|---|
| FP | 2 | −5.1 | 6 | 5 | 100 | 14 | 11 |
| SM VCSEL | 4 | −0.7 | 6 | 5 | +80 −40 | 14 | 9 |
| MM VCSEL | 24 | −6.4 | 11 | 11 | 170 | 23 | 26 |

As can be seen, the source positioning tolerances are in the µm range for the positioning of the source, and in the range of tens of µm for the positioning of the fiber. However, such micrometric precision can be obtained through an active optical alignment of the source (carried out in the production step of the termination) which allows the injection efficiency to be maximized. Moreover, precisions of tens of micrometers for the positioning of the optical elements and of the fiber can be obtained through a high-precision plastic mould that allows the optical elements (possibly molded from plastic as well), the bent fiber portion and the opto-electronic device to be positioned in the determined optimal position and to be kept in such positions.

As an example, the Applicant has considered the system performance of two point-to-point links according to the invention considering the Ethernet transmission standard 802.3 and two different transmission bit rates (100 Mbit/s and 1 Gbit/s); at the transmission side, a single mode VCSEL laser source at 850 nm having an end-of-life output power of −2 dBm; both at the reception and transmission side, a conventional spherical optical lens having a diameter of 1.5 mm and a refractive index n of 1.491 at a wavelength of 1310 nm; both at the reception and transmission side, a bending radius of the fiber of 2 mm; a multi-mode optical transmission fiber having typical attenuation values of the Ethernet standard 802.3 on a 550 m length; at the reception side, a high-precision photoreceiver having a diameter of the sensitive surface of 0.25 mm for transmission at 100 Mbit/s and a high-precision photoreceiver having a diameter of the sensitive surface of 0.12 mm for transmission at 1 Gbit/s; the extraction efficiency values displayed in Table 1 for the high-precision photoreceiver having a diameter of the sensitive surface of 0.25 mm, the injection efficiency values displayed in Table 3, and extraction efficiency values calculated for the high-precision photoreceiver having a diameter of the sensitive surface of 0.12 mm.

Tables 4 and 5 below show the power budget values that must be respected by the point-to-point link considered, considering the transmission bit rate of 100 Mbit/s and of 1 Gbit/s, respectively.

TABLE 4

| BIT RATE | 100 Mbit/s |
|---|---|
| TX POWER | −2 dBm |

TABLE 4-continued

| | |
|---|---|
| RX SENSITIVITY | −32.5 dBm |
| POWER BUDGET | 30.5 dB |

TABLE 5

| | |
|---|---|
| BIT RATE | 1 Gbps |
| TX POWER | −2 dBm |
| RX SENSITIVITY | −17 dBm |
| POWER BUDGET | 15 dB |

It can be seen that, along the considered point-to-point links at 100 Mbit/s and 1 Gbit/s, power losses of up to a maximum of 30.5 dB and 15 dB, respectively, are tolerated.

Tables 6 and 7 below show the values of the losses introduced through injection in bent fiber at the transmission side, through the considered optical fiber length and through extraction from bent fiber at the reception side.

TABLE 6

| | |
|---|---|
| BIT RATE | 100 Mbps |
| TX LOSS | 1 dB |
| FIBER LOSS (2 Km) | 7 dB |
| RX LOSS | 1.5 dB |
| MARGIN | 22 dB |

TABLE 7

| | |
|---|---|
| BIT RATE | 1 Gbps |
| TX LOSS | 1 dB |
| FIBER LOSS (0.5 Km) | 2 dB |
| RX LOSS | 3 dB |
| MARGIN | 9 dB |

As can be seen the point-to-point links considered allow power margins of 22 dB and 9 dB for the two transmission bit rates of 100 Mbit/s and 1 Gbit/s, respectively.

In general, in the calculation of the power margin other system penalties must be considered, like for example those due to inter symbol interference (ISI), to relative intensity noise (RIN) of the laser source and to the intermodal dispersion in optical fiber. At 100 Mbit/s these penalties are in general so small that they are certainly covered by the margin of 22 dB indicated above. In the case of transmission at 850 nm and at 1 Gbit/s, it has been found that such penalties are of about 5 dB at worst, so they are certainly covered by the margin of 9 dB indicated above. Moreover, possible misalignments of the optical system due, for example, to the ageing of the mechanical locking system of the fiber—or due to a deformation thereof owing to temperature variations or to heat cycles that the device can undergo during its use—can lead to small additional power losses, which the margin presented in the above tables must deal with.

Therefore, the values displayed above indicate that according to the invention it is possible to obtain a high-performance point-to-point link.

The point-to-point link according to the invention can be used in local area networks (LAN) preferably of the Ethernet type (IEEE 802.3) to extend the range of the links beyond the one hundred meters allowed by the copper infrastructure, or to implement the LAN network in optical fiber eliminating the need for expensive optical network interfaces in electrical terminal apparatuses and/or to implement "collapsed backbone" type network architecture which allows the elimination of the floor cabinet. The invention can also be used in access network architecture of the FTTP or FTTH ("fiber to the premises" or "fiber to the home") type. The application can also be extended for the interconnection of digital apparatuses (for example DVD provided with TV), for the interconnection of "hot spot" wireless with the network (e.g., Wi-Fi, UWB).

For example, the point-to-point link can be used to connect a distribution unit and a final user electrical apparatus in a network for distributing signals to a plurality of users.

In this case, the point-to-point link is advantageously bidirectional so as to transmit both signals from the distribution unit towards the user apparatus and signals coming from the user apparatus towards the distribution unit.

For example, the two-way point-to-point link 10 is of the type described with reference to FIG. 4 and both of the opto-electronic conversion apparatuses are of the type described with reference to FIGS. 2 and 5.

Figure 8:
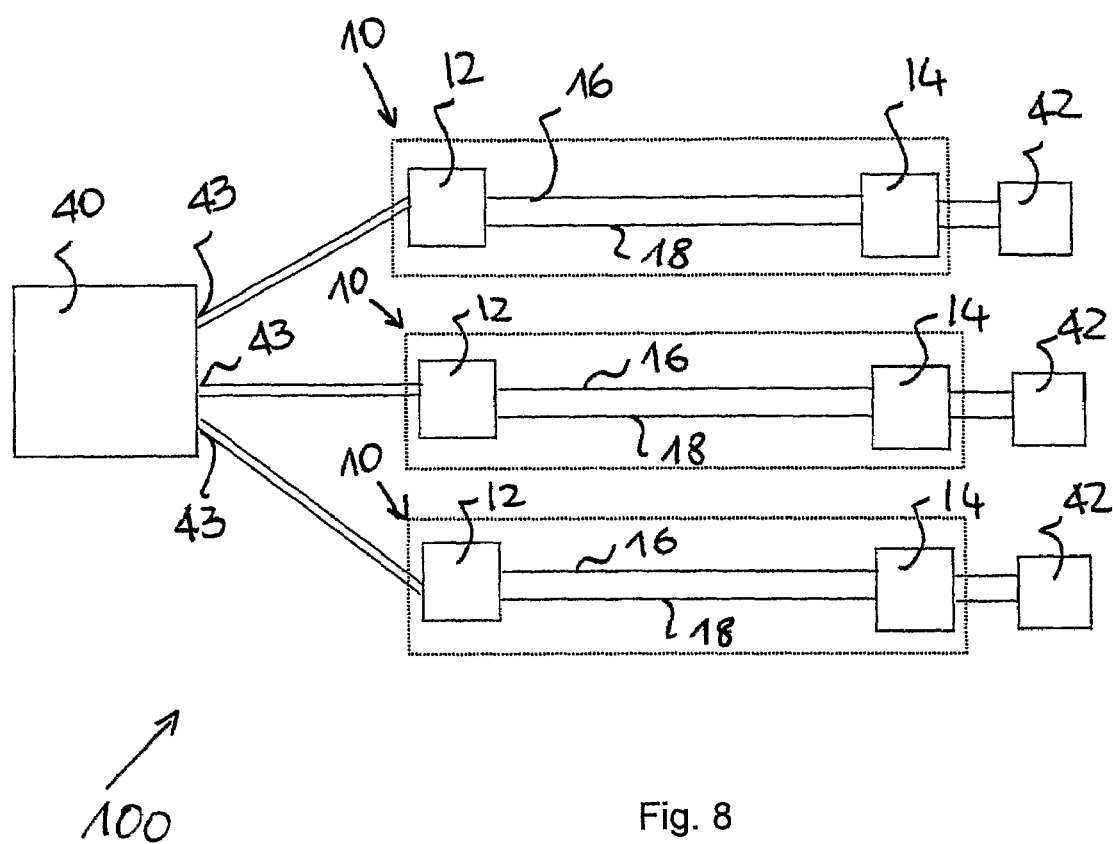
FIG. 8 schematically shows an embodiment of a signal distribution network comprising a plurality of point-to-point links according to the invention.

FIG. 8 shows an embodiment of a network 100 for distributing signals comprising a plurality of point-to-point links 10 of the type herein disclosed (for the sake of simplicity of explanation, in FIG. 8 only 3 point-to-point links have been shown) and a distribution unit 40 having two input/output ports 43 for each point-to-point link 10. Each point-to-point link 10 is connected to a respective user apparatus 42 (for example a Personal Computer, a printer, a digital device with Ethernet or FastEthernet interface). In particular, each user apparatus 42 is connected to an opto-electronic conversion apparatus 14 of the respective point-to-point link 10.

For example, the network 100 is a network for distributing digital signals to a plurality of user apparatuses according to a Fastethernet™, GigabitEthernet or 10 Gigabit Ethernet protocol. Such signals arrive at the distribution unit 40 and are then sent to the various user apparatuses 42 according to a FastEthernet™ type protocol.

For example, the processing unit 40 is a SWITCH CATALYST 3550 produced by CISCO SYSTEMS.

In general, the point-to-point links according to the invention can be used to transmit a plurality of digital television and/or telephone and/or Internet signals coming from a long-distance transmission via satellite and/or via copper cable (e.g. coaxial or pair) and/or via optical fiber and/or via ether towards (and from) a plurality of electrical user apparatuses 42.

Figure 9:
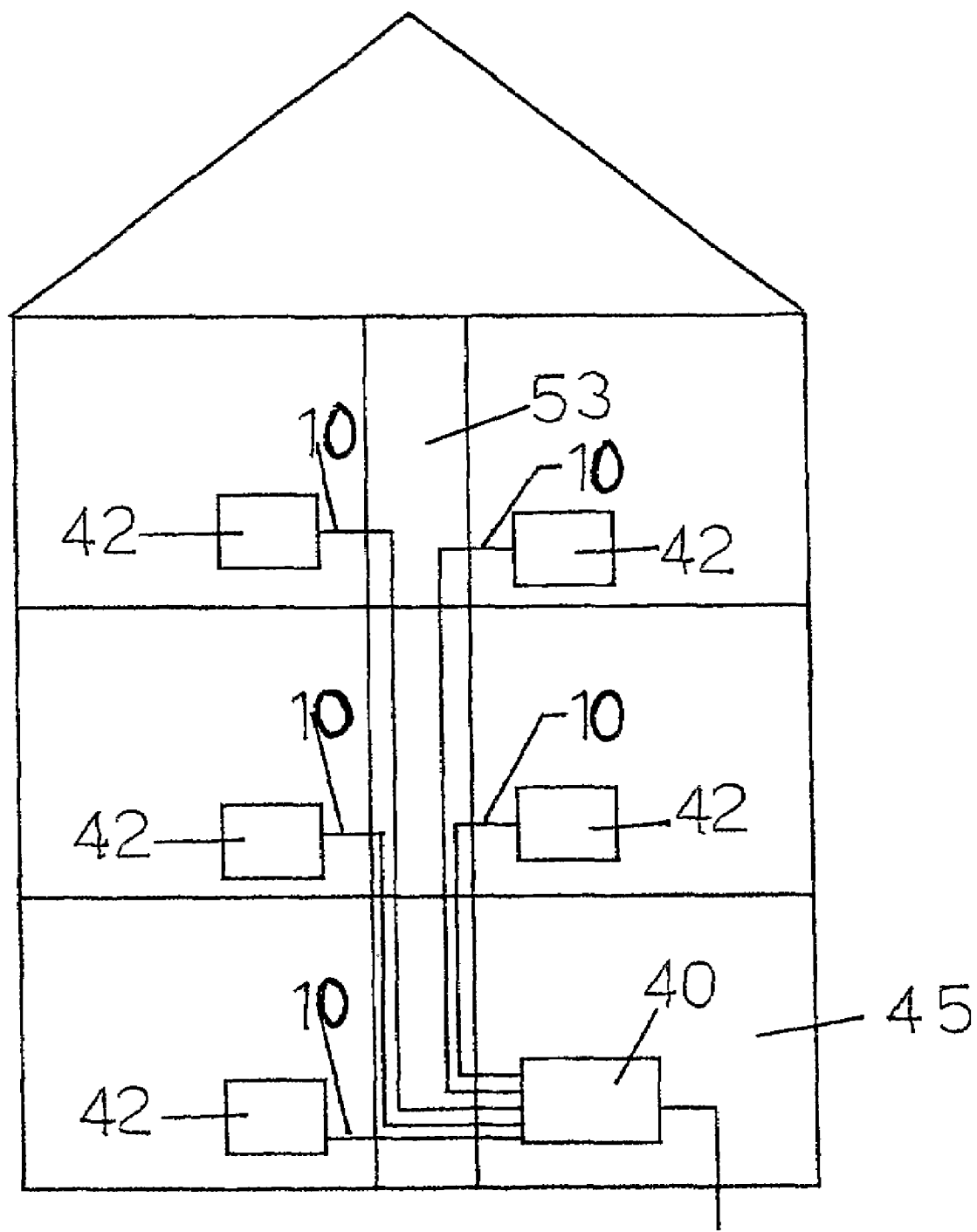
FIG. 9 shows a signal distribution network according to the invention installed in a building.

FIG. 9 schematically shows a distribution network 100 according to the invention installed in a building. The distribution unit 40 is arranged in a cellar or basement 45 of the building and the point-to-point links 10—with the relative optical cable housed in a suitable raceway 53 of the building—connect the distribution unit 40 to the user apparatuses 42 situated at the various levels of the building.

In a typical residential application, one of the two opto-electronic conversion apparatuses of each point-to-point link shall, for example, be suitable for being integrated on a wall-outlet of a user's home and shall have an electrical port to which a RJ45 type connector of an electrical cable for connection to an electrical user apparatus can be connected.

The opto-electronic conversion apparatus installed on the wall of the user's home can advantageously be power supplied through an electrical power supply already present in the home's wall.

In a typical office application, the point-to-point links according to the invention can comprise, along their path, one or more connection points. More specifically, each point-to-point link can comprise two (or more) parts interconnected to each other through optical connectors, mechanical joints for optical fibers, fused junctions, or other techniques available for joining two optical fibers. According to an example of this type of application, the distribution unit 40 shall be arranged in a cellar or in a basement of the building and on each floor of the building a suitable centralized connection point (patch panel) shall be provided for the management of the intermediate fiber terminations. Moreover, each point-to-point link shall, for example, comprise two parts, each part terminating at one end with an opto-electronic conversion apparatus and at the other end with an optical connector. In this way, one of the two parts of the point-to-point link shall connect the distribution unit 40 and the centralized connection point whereas the other part of the point-to-point link shall connect the centralized connection point and the respective user apparatus. The two parts of the point-to-point link can be connected together and disconnected apart through the optical connectors. This type of structure allows the final user to bring the fiber optic point-to-point link directly at each user apparatus through an architecture compatible with that already present in the structured wiring standards (CEI EN 50173-1).

The invention claimed is:

1. A point-to-point link for the transmission of digital signals comprising two opto-electronic conversion apparatuses and an optical cable comprising at least one optical fiber having two terminal portions, each opto-electronic conversion apparatus comprising an opto-electronic device optically coupled to a respective terminal portion between said two terminal portions, comprising:
    at least one of the two opto-electronic conversion apparatuses adapted to keep the respective terminal portion of the optical fiber in a bent position with a bending radius R, where 1.5 mm≦R≦2.5 mm, and to keep the respective opto-electronic device optically coupled to said bent terminal portion in order to allow the transmission of said digital signals between said optical fiber and the opto-electronic conversion apparatus; and
    at least the bent terminal portion of said at least one optical fiber being such as to satisfy the relationship r/R<0.07*n/(35+n), where n is the stress corrosion susceptibility factor and r is the radius of the cladding of the optical fiber.

2. The point-to-point link according to claim 1, wherein the bending radius R is less than 2.2 mm.

3. The point-to-point link according to claim 1, wherein said at least one optical fiber is multi-mode.

4. The point-to-point link according to claim 1, wherein said at least one optical fiber has a cladding having an external diameter of less than 125 μm.

5. The point-to-point link according to claim 1, wherein n is equal to at least 20.

6. The point-to-point link according to claim 5, wherein n is equal to at least 22.

7. The point-to-point link according to claim 1, wherein one of the two opto-electronic devices is a light source.

8. The point-to-point link according to claim 7, wherein the other opto-electronic device is a photodetector.

9. The point-to-point link according to claim 1, wherein said at least one opto-electronic conversion apparatus, adapted to keep the respective terminal portion of optical fiber bent, also comprises focusing optics associated with the bent terminal portion and with the respective opto-electronic device.

10. The point-to-point link according to claim 1, wherein said at least one opto-electronic conversion apparatus, adapted to keep the respective terminal portion of optical fiber bent, also comprises a mode scrambler associated with the bent terminal portion of the optical fiber.

11. The point-to-point link according to claim 1, wherein both opto-electronic conversion apparatuses are adapted to keep the relative terminal portions of the optical fiber in bent positions with a bending radius R, where 1.5 mm≦R≦2.5 mm, and to keep the respective opto-electronic devices optically coupled to the respective bent terminal portion in order to allow the transmission of said digital signals between said optical fiber and said opto-electronic conversion apparatuses.

12. The point-to-point link according to claim 11, wherein both of the terminal portions of said at least one optical fiber are such as to satisfy said relationship r/R<0.07*n/(35+n).

13. The point-to-point link according to claim 1, adapted to allow a two-way propagation of digital signals.

14. The point-to-point link according to claim 13, wherein each opto-electronic conversion apparatus also comprises a second opto-electronic device.

15. The point-to-point link according to claim 14, wherein the optical cable comprises a second optical fiber having two terminal portions respectively connected to the two opto-electronic conversion apparatuses through the respective second opto-electronic device.

16. The point-to-point link according to claim 15, wherein said at least one opto-electronic conversion apparatus, adapted to keep the respective terminal portion of the first optical fiber in the bent position, is also adapted to keep the respective terminal portion of the second optical fiber in bent position with a bending radius R, where 1.5 mm≦R≦2.5 mm, and to keep the second opto-electronic device optically coupled to the bent terminal portion of the second optical fiber in order to allow the transmission of said digital signals between said second optical fiber and said opto-electronic conversion apparatus.

17. The point-to-point link according to claim 16, wherein the bent terminal portion of the second optical fiber is such as to satisfy said relationship r/R<0.07*n/(35+n).

18. The point-to-point link according to claim 14, wherein, in each of the two opto-electronic conversion apparatuses, one of the two opto-electronic devices is a light source and the other is a photodetector.

19. The point-to-point link according to claim 15, wherein both of the opto-electronic conversion apparatuses are adapted to keep both relative terminal portions of the first and second optical fiber in bent positions with a bending radius R, where 1.5 mm≦R≦2.5 mm, and to keep the respective opto-electronic devices optically coupled to the respective bent terminal portions in order to allow the transmission of said digital signals between the first and second optical fiber and said opto-electronic conversion apparatuses.

20. The point-to-point link according to claim 18, wherein both terminal portions of the first optical fiber and of the second optical fiber are such as to satisfy said relationship r/R<0.07*n/(35+n).

21. A network for distributing digital signals to a plurality of user apparatuses, said network comprising:
    a distribution unit having a plurality of electrical ports; and
    a plurality of point-to-point links each connected to at least one respective electrical port of the distribution unit so as to put said distribution unit in communication with said plurality of user apparatuses, each point-to-point link comprising two opto-electronic conversion apparatuses and an optical cable comprising at least one optical fiber having two terminal portions, each opto-electronic conversion apparatus comprising an opto-electronic device optically coupled to a respective terminal portion of said two terminal portions,
    at least one of the two opto-electronic conversion apparatuses of each point-to-point link being adapted to keep the respective terminal portion of the optical fiber in a bent position with a bending radius R, where 1.5 mm≦R≦2.5 mm, and to keep the respective opto-electronic device optically coupled to said bent terminal portion in order to allow the transmission of said digital signals between said optical fiber and said opto-electronic conversion apparatus, and at least the bent terminal portion of said optical fiber being such as to satisfy the relationship $r/R < 0.07 * n/(35+n)$, where n is the stress corrosion susceptibility factor and r is the radius of the cladding of the optical fiber.

22. A method for connecting an optical cable to an opto-electronic conversion device for the transmission of digital signals in a signal distribution network, said optical cable comprising a cable jacket and at least one optical fiber, comprising the steps of:

a) removing the cable jacket at a terminal portion of said at least one optical fiber;

b) inserting the terminal portion of said at least one optical fiber, stripped of the cable jacket, in a housing adapted to keep said terminal portion in a bent position with a bending radius R, where 1.5 mm≦R≦2.5 mm, and to keep the opto-electronic conversion device in an optical coupling position with respect to the bent terminal portion, at least the bent terminal portion of said at least one optical fiber being such as to satisfy the relationship $r/R < 0.07 * n/(35+n)$, where n is the stress corrosion susceptibility factor and r is the radius of the cladding of the optical fiber.

* * * * *